US009827536B2

(12) United States Patent
Yoneda et al.

(10) Patent No.: US 9,827,536 B2
(45) Date of Patent: Nov. 28, 2017

(54) COMPOSITE SEMIPERMEABLE MEMBRANE

(71) Applicant: TORAY INDUSTRIES, INC., Tokyo (JP)

(72) Inventors: Keisuke Yoneda, Otsu (JP); Jun Okabe, Otsu (JP); Takao Sasaki, Otsu (JP); Masahiro Kimura, Otsu (JP); Masahiro Henmi, Tokyo (JP)

(73) Assignee: Toray Industries, Inc., Tokyo (JP)

( * ) Notice: Subject to any disclaimer, the term of this patent is extended or adjusted under 35 U.S.C. 154(b) by 185 days.

(21) Appl. No.: 14/429,934

(22) PCT Filed: Sep. 19, 2013

(86) PCT No.: PCT/JP2013/075315
§ 371 (c)(1),
(2) Date: Aug. 21, 2015

(87) PCT Pub. No.: WO2014/050701
PCT Pub. Date: Apr. 3, 2014

(65) Prior Publication Data
US 2015/0343393 A1  Dec. 3, 2015

(30) Foreign Application Priority Data

Sep. 26, 2012  (JP) .................... 2012-212741

(51) Int. Cl.
| B01D 69/00 | (2006.01) |
| C02F 1/44 | (2006.01) |
| B01D 71/56 | (2006.01) |
| B01D 61/08 | (2006.01) |
| B01D 69/10 | (2006.01) |
| B01D 69/12 | (2006.01) |
| B01D 67/00 | (2006.01) |
| B01D 71/44 | (2006.01) |
| B01D 69/14 | (2006.01) |
| B01D 71/68 | (2006.01) |
| C02F 103/08 | (2006.01) |

(52) U.S. Cl.
CPC ............ *B01D 71/56* (2013.01); *B01D 61/08* (2013.01); *B01D 67/0006* (2013.01); *B01D 69/10* (2013.01); *B01D 69/12* (2013.01); *B01D 69/125* (2013.01); *B01D 69/141* (2013.01); *B01D 71/44* (2013.01); *B01D 71/68* (2013.01); *C02F 1/441* (2013.01); *C02F 2103/08* (2013.01)

(58) Field of Classification Search
None
See application file for complete search history.

(56) References Cited

U.S. PATENT DOCUMENTS

| 5,989,426 | A | 11/1999 | Hirose |
| 6,432,309 | B1 | 8/2002 | Fuke |
| 2002/0162792 | A1* | 11/2002 | Zepf ............... B01D 67/0011 |
| | | | 210/500.21 |
| 2006/0000766 | A1 | 1/2006 | Ji |
| 2007/0187320 | A1 | 8/2007 | Mabuchi |
| 2007/0199891 | A1 | 8/2007 | Mabuchi |
| 2009/0050558 | A1 | 2/2009 | Ishizuka |
| 2010/0163488 | A1 | 7/2010 | Fislage |
| 2012/0043274 | A1 | 2/2012 | Chi |
| 2013/0213880 | A1 | 8/2013 | Hirozawa |
| 2014/0183127 | A1 | 7/2014 | Nakatsuji |
| 2014/0339152 | A1 | 11/2014 | Okabe |
| 2015/0014244 | A1 | 1/2015 | Shimura |

FOREIGN PATENT DOCUMENTS

| CN | 102068924 | 5/2011 |
| EP | 0568045 | 11/1993 |
| JP | 0278428 | 3/1990 |
| JP | 0919630 | 1/1997 |
| JP | 09103664 | 4/1997 |
| JP | 2001252538 | 9/2001 |
| JP | 2001252541 | 9/2001 |
| JP | 2006130497 | 5/2006 |
| JP | 2007090192 | 4/2007 |
| JP | 2008253906 | 10/2008 |
| JP | 2011050914 | 3/2011 |
| KR | 20120100379 | 9/2012 |
| WO | 0189673 | 11/2001 |
| WO | 2012057028 | 5/2012 |
| WO | 2012137635 | 10/2012 |
| WO | 2013108788 | 7/2013 |
| WO | 2013129610 | 9/2013 |

OTHER PUBLICATIONS

Chinese Office Action mailed Nov. 13, 2015 for Chinese Application No. 201380047253.8, including English translation.
Chinese Office Action dated Jul. 7, 2016 for Chinese Application No. 201380047253.8, including English translation, 10 pages.
Extended European Search Report dated Jul. 7, 2016 for European Application No. 13840663.2, 11 pages.
International Preliminary Report on Patentability and Written Opinion for International Application No. PCT/JP/2013/075315 mailed Mar. 31, 2015.
International Search Report for International Application No. PCT/JP2013/075315 mailed Dec. 17, 2013.
European Search Report for European Application No. 13840663.2, dated Sep. 26, 2017, 5 pages.

\* cited by examiner

*Primary Examiner* — Allison Fitzsimmons
(74) *Attorney, Agent, or Firm* — RatnerPrestia

(57) ABSTRACT

Provided is a composite semipermeable membrane having a high salt removal rate and a high water permeability. The composite semipermeable membrane comprises a substrate, a porous support layer formed on the substrate, and a separation functional layer formed on the porous support layer, the hydrophilic macromolecule concentration on the substrate-side surface of the porous support layer being higher than that on the separation functional layer-side surface.

5 Claims, No Drawings

COMPOSITE SEMIPERMEABLE MEMBRANE

CROSS REFERENCE TO RELATED APPLICATIONS

This is the U.S. National Phase application of PCT/JP2013/075315, filed Sep. 19, 2013, which claims priority to Japanese Patent Application No. 2012-212741, filed Sep. 26, 2012, the disclosures of each of these applications being incorporated herein by reference in their entireties for all purposes

FIELD OF THE INVENTION

The present invention relates to a composite semipermeable membrane useful for selective separation of a liquid mixture. The composite semipermeable membrane obtained by the present invention can be used suitably for, for example, desalination of seawater and brine water.

BACKGROUND OF THE INVENTION

With respect to separation of a mixture, there are various techniques for removing a substance (for example, a salt) dissolved in a solvent (for example, water) and the use of membrane-separation methods has been expanding as a process for saving energy and resources in recent years. Examples of a membrane used in the membrane-separation methods include a microfiltration membrane, an ultrafiltration membrane, a nanofiltration membrane, and a reverse osmosis membrane and these membranes are used for obtaining drinking water from, for example, seawater, brine water, or water containing a harmful substance, producing industrial ultrapure water, treating effluent, and recovering valuables.

Most commercially available reverse osmosis membranes and nanofiltration membranes are composite semipermeable membranes, which are divided into two types: one having, on a support membrane, a gel layer and an active layer obtained by the cross-linking of polymers; and the other having an active layer obtained by polycondensation of monomers on a support membrane. Among them, a composite semipermeable membrane obtained by coating a support membrane with a separation functional layer comprising cross-linked polyamide obtained by polycondensation of a polyfunctional amine and a polyfunctional acid halide is widely used as a separation membrane having a high permeability and a high selective separation performance.

In a water distillation plant using a reverse osmosis membrane, a higher water permeation performance is demanded for further reduced running cost. As a solution to such a demand, a method in which a composite semipermeable membrane provided with cross-linked polyamide polymers as a separation functional layer is brought into contact with an aqueous solution containing nitrous acid is known (patent literature 1). The water permeation performance can be improved by this treatment while the boron removal rate before the treatment is maintained. However, the resulting water permeation performance is not sufficient.

One factor that affects the water permeability of a composite semipermeable membrane is the structure of protuberances. It is proposed to enlarge the protuberances and thereby increase the substantive membrane area and water permeability (patent literature 2). In this proposal, addition of various additives at the time of interfacial polymerization results in larger protuberances and increased water permeability, but there is a concern about lowered desalination rate.

The water permeability of a composite semipermeable membrane seems to be affected by not only the water permeability of the separation functional layer itself but also that of the support membrane. In order to improve the water permeability of the support membrane, a support membrane produced from a solution of mixed hydrophilic macromolecules has been developed (patent literatures 3 and 4). However, in such hydrophilic support membrane, the hydrophilic macromolecules concentrate near the separation functional layer side and form a dense layer, which causes insufficient formation of a protuberance structure and results in a problem of decreased water permeability.

CITATION LIST

Patent Literature

PTL 1: Japanese Unexamined Patent Publication No. 2007-090192
PTL 2: Japanese Unexamined Patent Publication No. 9-19630
PTL 3: Japanese Unexamined Patent Publication No. 9-103664
PTL 4: Japanese Unexamined Patent Publication No. 2011-050914

SUMMARY OF INVENTION

None of the above proposals achieved sufficient levels of water permeability and salt removal rate in combination, and the prior art leaves room for improvement. Therefore, an object of the present invention is to provide a composite semipermeable membrane having a high salt removal rate and a high water permeability.

The inventors found that the above-mentioned purpose could be achieved by using a hydrophilic support membrane which has a characteristic configuration and does not prevent the formation of a protuberance structure of a separation functional layer.

That is, the present invention for achieving the above-mentioned purpose includes the following configurations.

(1) A composite semipermeable membrane comprising a substrate, a porous support layer formed on the substrate, and a separation functional layer formed on the porous support layer, the porous support layer having a higher concentration of hydrophilic macromolecules on the substrate-side surface than that on the separation functional layer-side surface.

(2) The composite semipermeable membrane according to the above (1), wherein the porous support layer is formed by applying a macromolecular solution A containing hydrophilic macromolecules for forming a first layer onto the substrate, at the same time applying a macromolecular solution B not containing hydrophilic macromolecules for forming a second layer, and subsequently bringing the substrate into contact with a coagulating bath for phase separation.

(3) The composite semipermeable membrane according to the above (2), wherein the hydrophilic macromolecule is polyvinylpyrrolidone or a copolymer containing polyvinylpyrrolidone as a hydrophilic site.

(4) The composite semipermeable membrane according to any of the above (1) to (3), wherein the separation functional layer contains cross-linked polyamide as a major component.

(5) The composite semipermeable membrane according to any of the above (1) to (4), wherein the substrate is a filament non-woven fabric containing polyester as a major component.

The present invention makes it possible to provide a composite semipermeable membrane having both a high water permeability and a high salt removal rate.

DESCRIPTION OF EMBODIMENTS OF THE INVENTION

1. Composite Semipermeable Membrane

A composite semipermeable membrane comprising a substrate, a porous support layer formed on the substrate, and a separation functional layer formed on the porous support layer, the porous support layer having a higher concentration of hydrophilic macromolecules on the substrate-side surface than that on the separation functional layer-side surface.
(1-1) Support Membrane The support membrane of an embodiment of the present invention comprises a substrate and a porous support layer, does not substantially have an ability to separate ions or the like, and is for imparting strength to a separation functional layer, which substantially has a separation ability.

The thickness of the support membrane affects the strength of the composite semipermeable membrane and the packing density of a membrane element made up of the composite material. In order to obtain a sufficient mechanical strength and a sufficient packing density, the thickness of the support membrane is preferably within the range of 30 to 300 µm, and more preferably within the range of 50 to 250 µm.

Herein, the thickness of each of the layers or the membranes means an average value unless otherwise stated. The average value herein is an arithmetic mean, value. That is, the thickness of each of the layers and the membranes can be obtained by calculating the average value of thicknesses measured at 20 points at 20 µm intervals in a direction perpendicular to the thickness direction (a direction along the membrane surface) in cross-section observation.
Substrate Examples of the major component of the substrate composing the support membrane include polyester-based polymers, polyamide-based polymers, polyolefin-based polymers, and mixtures and copolymers thereof. Among them, polyester-based polymers are preferred because a support membrane which is more excellent in mechanical strength, thermal resistance, water resistance, and the like can be obtained when the major component is a polyester-based polymer.

The polyester-based polymer is a polyester composed of an acid component and an alcohol component.

As the acid component, an aromatic carboxylic acid such as terephthalic acid, isophthalic acid, or phthalic acid, an aliphatic dicarboxylic acid such as adipic acid or sebacic acid, an alicyclic dicarboxylic acid such as cyclohexanecarboxylic acid, or the like can be used.

Moreover, as the alcohol component, ethylene glycol, diethylene glycol, polyethylene glycol, or the like can be used.

The phrase "comprising polyester as a major component" and the phrase "comprising polyester-based polymer as a major component" are synonymous. The ratio of the acid component and the alcohol component, both of which compose the polyester-based polymer, is not particularly limited as long as it is within the range usually used.

Examples of the polyester-based polymer include a polyethylene terephthalate resin, a polybutylene terephthalate resin, a polytrimethylene terephthalate resin, a polyethylene naphthalate resin, a polylactic resin, and a polybutylene succinate resin, and also copolymers of these resins. Among them, a homopolymer or a copolymer of polyethylene terephthalate is preferably used.

The substrate in an embodiment of the present invention is a fabric-like one comprising the above polymer. A fabric in which the polymer is fibrous is preferably used for the substrate in view of strength and fluid permeability.

As the fabric, both a filament non-woven fabric and a staple fiber non-woven fabric can be preferably used.

In particular, a filament non-woven fabric used as the substrate shows excellent permeability when a solution of macromolecular polymer to compose the porous support layer is cast, and therefore can suppress unfavorable peeling-off of the porous support layer, nonuniformity in the membrane due to fluffing of the substrate and the like, and defects such as a pin-hole. Therefore, in particular, the substrate preferably is composed of a filament non-woven fabric. In particular, a filament non-woven fabric comprising thermoplastic continuous filaments is more preferred.

Accordingly, the substrate in the present invention is preferably a filament non-woven fabric containing polyester as a major component.

In the filament non-woven fabric and the staple fiber non-woven fabric, in view of formability and strength, the fibers in the surface layer on the opposite side to the porous support layer are preferably more longitudinally oriented than those in the surface layer on the porous support layer side. That is, the degree of fiber orientation of the surface layer on the opposite side to the porous support layer is preferably lower than that of the surface layer on the porous support layer side.

Such a structure is preferred because it allows the composite semipermeable membrane to maintain its strength and to achieve a good prevention effect against membrane breakage or the like.

More specifically, the degree of fiber orientation of the surface layer on the opposite side to the porous support layer of the filament non-woven fabric and the staple fiber non-woven fabric is preferably 0 to 25°. Moreover, the difference between the degree of fiber orientation of the surface layer on the opposite side to the porous support layer and that of the surface layer on the porous support layer side is preferably 10 to 90°.

"Degree of fiber orientation" as used herein is an index indicating the direction of fibers in cases where the substrate is a non-woven fabric. Specifically, it is an average value of the angles formed by the membrane-forming direction in continuous membrane formation, i.e., the longitudinal direction of the non-woven fabric substrate and the longitudinal directions of the fibers composing the non-woven fabric substrate. That is, when the longitudinal direction of the fiber is parallel to the membrane-forming direction, the degree of fiber orientation is 0°. Moreover, when the longitudinal direction of the fiber is perpendicular to the membrane-forming direction, that is, parallel to the width direction of the non-woven fabric substrate, the degree of fiber orientation is 90°. Thus, it is shown that the closer to 0° the degree of fiber orientation is, the more longitudinally orientated the fibers are; and the closer to 90° the degree of fiber orientation is, the more transversely orientated the fibers are.

In the process of producing the composite semipermeable membrane or the composite semipermeable membrane element, a heating step may be included and the heating causes the porous support layer or the separation functional layer to shrink. The shrinking is remarkable, in particular, in the width direction in which no tension is applied during the continuous membrane formation. Such shrinkage of the porous support layer or the separation functional layer decreases the dimension stability, and therefore a non-woven fabric substrate having a low thermal dimensional change rate is desired. In the non-woven fabric substrate, when the difference between degree of fiber orientation of the surface layer on the opposite side to the porous support layer and that of the surface layer on the porous support layer side is 10 to 90°, the shrinking in the width direction due to the heating can be suppressed.

The degree of fiber orientation is measured as follows.

First, 10 small sample pieces are taken at random from the non-woven fabric substrate. Then, the sample surfaces are photographed at a magnification of 100 to 1000 times with a scanning electron microscope. In the photographed images, 10 fibers are selected from each sample and the angles formed by the longitudinal direction of the non-woven fabric substrate and the fibers are measured. That is, angles of 100 fibers per non-woven fabric substrate are measured and the value obtained by rounding off the average value of the angles to the closest whole number is determined as the degree of fiber orientation.

The air permeability of the substrate is preferably 1.0 cc/cm² s or more, and more preferably 2.0 cc/cm² s or more. A composite semipermeable membrane having an air permeability in this range has a high water permeation flow rate. The reason seems to be as follows: in the step of forming the support membrane, when the substrate on which macromolecular polymers have been cast is immersed in a coagulating bath, such a high air permeability leads to a high non-solvent substitution rate and changes the internal structure of the porous support layer, and such a structural change will have influence on the subsequent step for forming the separation functional layer, specifically, will have influence on the amount of monomers retained by the separation functional layer and the diffusion rate of the monomers.

The air permeability can be measured with a frazier type tester in accordance with JIS L1096 (2010). For example, a 200 mm×200 mm piece is cut out from the substrate and attached to the frazier type tester. The suction fan and the air hole are adjusted so that the inclined barometer may indicate a pressure of 125 Pa, and the amount of air passing through the substrate, i.e., the air permeability can be calculated from a pressure indicated by the vertical barometer and the type of air hole used. The frazier type tester may be KES-F8-AP1, manufactured by Kato tech Co., Ltd., or the like.

The thickness of the substrate is preferably within the range of 10 μm to 200 μm, and more preferably within the range of 30 μm to 120 μm.

Porous Support Layer

As a material of the porous support layer composing the support membrane, a homopolymer or a copolymer of polysulfone, polyether sulfone, polyamide, polyester, cellulose-based polymer, vinyl polymer, polyphenylene sulfide, polyphenylene sulfide sulfone, polyphenylene sulfone, polyphenylene oxide or the like, can be used alone or in blend. The cellulose-based polymer may be cellulose acetate, cellulose nitrate, or the like and the vinyl polymer may be polyethylene, polypropylene, polyvinyl chloride, polyacrylonitrile, or the like. Among them, preferred is a homopolymer or a copolymer of polysulfone, polyamide, polyester, cellulose acetate, cellulose nitrate, polyvinyl chloride, polyacrylonitrile, polyphenylene sulfide, polyphenylene sulfide sulfone, polyphenylene sulfone, or the like. More preferred is cellulose acetate, polysulfone, polyphenylene sulfide sulfone, or polyphenylene sulfone. Further, among these materials, polysulfone, which is chemically, mechanically, and thermally highly stable and easy to mold, can be generally used.

Specifically, polysulfone, which is composed of the repeating unit shown in the following chemical formula, is preferably used due to its ease of pore size control and high dimension stability.

[Formula 1]

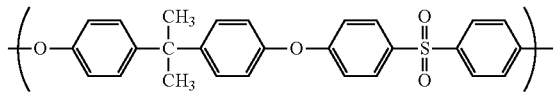

Polysulfone is characterized in that the mass-average molecular weight (Mw) measured by gel permeation chromatography (GPC) using N-methylpyrrolidone as a solvent and polystyrene as a reference material is preferably within the range of 10000 to 200000, or 15000 to 100000. With the Mw being 10000 or more, the porous support layer has preferable mechanical strength and thermal resistance. Moreover, with the Mw being 200000 or less, the viscosity of a solution thereof is within the appropriate range and a good formability is realized.

For example, by cast-molding of a N,N-dimethylformamide (hereinafter referred to as DMF) solution of the above polysulfone on the substrate in a uniform thickness and subsequent wet solidification thereof in water, a support membrane of which most of the surface has fine pores with a diameter of several to 30 nm can be obtained.

In the present invention, the porous support layer preferably has a multilayered structure. The porous support layer having a multilayered structure comprises two layers which are, for example, a first layer in contact with a substrate and a second layer in contact with a separation functional layer. The first layer requires to have peel strength necessary to adhere to the substrate and water permeability for allowing permeated water having passed through the separation functional layer to permeate through the first layer with a lower resistance. On the other hand, the second layer, as the polymerization field to form a separation functional layer, requires to have a flat, smooth and uniform surface structure, be able to retain and release monomers for forming the separation functional layer, and have an excellent adhesiveness to the separation functional layer.

In the present invention, the distribution state of the hydrophilic macromolecules in the porous support layer has a major effect on the performance of the separation functional layer. The porous support layer contains hydrophilic macromolecules and thereby has an increased water permeability, allowing the water having passed through the separation functional layer to permeate through the porous support layer with a low resistance. However, when a larger number of hydrophilic macromolecules are distributed on the separation functional layer side of the porous support layer, a dense skin layer is formed near the surface important in forming the separation functional layer, which works adversely to the formation of the protuberance structure necessary to achieve a high water permeability of the separation functional layer. Accordingly, it is required that a larger number of hydrophilic macromolecules be distributed on the substrate-side surface of the porous support layer and fewer hydrophilic macromolecules be distributed on the separation functional layer-side surface. The porous support layer having such a hydrophilic macromolecule distribution has an improved water permeability of itself while maintaining a high water permeability of the separation functional layer, and therefore a composite semipermeable membrane using the porous support layer exhibits a high water permeability.

The inventors found that a support membrane having a higher water permeability can be obtained and a high water permeability of the separation functional layer can be maintained when the first layer of the porous support layer comprises hydrophilic macromolecules mixed thereinto. The hydrophilic macromolecule may be any macromolecule which is substantially soluble in water, and specific examples of the macromolecule include polyvinylpyrrolidone, polyvinyl alcohol, polyethylene glycol, polyethyleneimine, polyallylamine, polyacrylic acid, carboxymethyl cellulose, and block copolymers, graft copolymers, and random copolymers of these hydrophilic macromolecules with hydrophobic macromolecules. They may be used alone or as a mixture thereof. Among these hydrophilic macromolecules, polyvinylpyrrolidone, in particular, is suitably used because it is excellent in compatibility with polysulfone used for the porous support layer. These hydrophilic macromolecules are cross-linked by a radiation cross-linking method after the formation of a support membrane, and thereby made insoluble in water.

The molecular weight of the hydrophilic macromolecule is preferably within the range of 500 to 1500000, and more preferably within the range of 10000 to 1000000. When the molecular weight is within the above range, the molecules are easy to handle at the time of use as a solution and also easy to cross-link by the radiation cross-linking method.

The hydrophilic macromolecule concentrations of the substrate-side surface and separation functional layer-side surface of the porous support layer are calculated, for example, by attenuated total reflection infrared (hereinafter referred to as ATR-IR) spectroscopy. A part of the support membrane is cut out, and the porous support layer thereof is peeled off from the substrate. On each of the substrate-side surface and separation functional layer-side surface of the porous support layer, the infrared absorption peak intensity ($A_{CO}$) at 1680 cm$^{-1}$ derived from the C=O bond of polyvinylpyrrolidone and the infrared absorption peak intensity ($A_{COC}$) at 1244 cm$^{-1}$ derived from the C—O—C bond of polysulfone are measured by ATR-IR spectroscopy, and then the ratio ($A_{CO}$)/($A_{COC}$) is calculated.

The infrared absorption peak intensity ratio ($A_{CO}$)/($A_{COC}$) on the substrate-side surface of the porous support layer is preferably within the range of 0.03 to 0.3, and more preferably within the range of 0.05 to 0.1. The ratio less than 0.03 cannot achieve an increased water permeability and therefore is not preferred. On the other hand, the ratio over 0.3 means the existence of a large amount of polyvinylpyrrolidone, which leads to decreased adhesiveness between the porous support layer and the substrate, and therefore is not preferred.

The infrared absorption peak intensity ratio ($A_{CO}$)/($A_{COC}$) on the separation functional layer-side surface of the porous support layer is preferably 0.025 or less, and more preferably 0.015 or less. The ratio of 0.025 or less provides a polymerization field necessary for the formation of the separation functional layer.

The thickness of the porous support layer is preferably within the range of 10 to 200 μm, and more preferably within the range of 20 to 100 μm. The thickness of the substrate is preferably within the range of 10 to 250 μm, and more preferably within the range of 20 to 200 μm. With the thicknesses of the substrate and the porous support layer being within the above ranges, the composite semipermeable membrane has a sufficient mechanical strength and a composite semipermeable membrane element has a sufficient packing density as mentioned above.

The thickness of the first layer (layer in contact with the substrate) of the porous support layer is preferably within the range of 10 to 90% of the thickness of the whole porous support layer. The thickness of the first layer less than 10% means an extremely large amount of hydrophilic macromolecules existing on the substrate-side surface, which leads to decreased adhesiveness between the substrate and the porous support layer, and therefore is not desirable. On the other hand, the thickness of the first layer over 90% means a large amount of hydrophilic macromolecules existing also on the separation functional layer side and working adversely to the formation of the protuberances in the separation functional layer, and therefore is not desirable.

(1-2) Separation Functional Layer

The separation functional layer is a layer performing a solute separation function in a composite semipermeable membrane. The constitutions of the separation functional layer such as the composition and the thickness are set depending on the purpose of use of the composite semipermeable membrane.

Polyamide Separation Functional Layer

The separation functional layer may contain, for example, polyamide as a major component. The polyamide composing the separation functional layer can be produced by interfacial polycondensation of a polyfunctional amine and a polyfunctional acid halide. At least either the polyfunctional amine or the polyfunctional acid halide preferably contains a trifunctional or higher polyfunctional compound.

Herein, the phrase "X contains Y as a major component" means that Y accounts for 50% by weight or more of X, and encompasses the composition in which X substantially contains only Y.

In general, the thickness of the polyamide separation functional layer is preferably within the range of 0.01 to 1 μm, and more preferably within the range of 0.1 to 0.5 μm so that a sufficient separation performance and a sufficient permeate flow rate may be obtained. The polyfunctional amine herein refers to an amine having at least two primary and/or secondary amino groups in one molecule, at least one of the amino groups being a primary amine group. Examples of the polyfunctional amine include aromatic polyfunctional amines such as phenylenediamine, in which two amino groups are bonded to a benzene ring at any of the ortho-, meta-, and para-position, xylylenediamine, 1,3,5-triaminobenzene, 1,2,4-triaminobenzene, 3,5-diaminobenzoic acid, 3-aminobenzylamine, and 4-aminobenzylamine; aliphatic amines such as ethylenediamine and propylenediamine; and alicyclic polyfunctional amines such as 1,2-diaminocyclohexane, 1,4-diaminocyclohexane, 4-aminopiperidine, and 4-aminoethylpiperazine. Among them, aromatic polyfunctional amines having 2 to 4 primary and/or secondary amino groups in one molecule are preferred in view of the selective separation performance, permeability, and thermal resistance of the membrane. As such an aromatic polyfunctional amine, m-phenylenediamine, p-phenylenediamine, and 1,3, 5-triaminobenzene are suitably used. Among them, m-phenylenediamine (hereinafter referred to as m-PDA) is preferred for ease of availability and handling. These polyfunctional amines may be used alone or in combination of two or more kinds. In cases where two or more kinds are used at the same time, the above amines may be combined with one or more thereof, or combined with one or more amines having at least two secondary amino groups in one molecule. Examples of the amine having at least two secondary amino groups in one molecule include piperazine and 1,3-bispiperidylpropane.

The polyfunctional acid halide refers to an acid halide having at least two halogenated carbonyl groups in one molecule. Examples of a trifunctional acid halide include trimesic acid chloride, 1,3,5-cyclohexanetricarboxylic acid trichloride, and 1,2,4-cyclobutanetricarboxylic acid trichloride. Examples of a bifunctional acid halide include aromatic bifunctional acid halides such as biphenyldicarboxylic acid dichloride, azobenzenedicarboxylic acid dichloride, terephthalic acid chloride, isophthalic acid chloride, and naphthalenedicarboxylic acid chloride; aliphatic bifunctional acid halides such as adipoyl chloride and sebacoyl chloride; and alicyclic bifunctional acid halides such as cyclopentanedicarboxylic acid dichloride, cyclohexanedicarboxylic acid dichloride, and tetrahydrofurandicarboxylic acid dichloride. In view of reactivity with a polyfunctional amine, polyfunctional acid chlorides are preferred as the polyfunctional acid halide. Moreover, in view of the selective separation performance and thermal resistance of the membrane, aromatic polyfunctional acid chlorides having 2 to 4 carbonyl chloride groups in one molecule are preferred as the polyfunctional acid chloride. Among them, in view of ease of availability and handling, trimesic acid chlorides are still more preferably used. These polyfunctional acid halides may be used alone or in combination of two or more kinds thereof.

2. Production Method of Composite Semipermeable Membrane

A production method of the above composite semipermeable membrane will be described. The production method comprises a step of forming a support membrane and a step of forming the separation functional layer.

(2-1) Step of Forming Support Membrane

The step of forming a support membrane may comprise a step of applying a macromolecular solution for forming the porous support layer onto a substrate,
a step of impregnating the substrate with the macromolecular solution, and
a step of immersing the substrate impregnated with the macromolecular solution in a coagulating bath filled with a solution having a lower solubility of the macromolecule compared to that of a good solvent of the macromolecule (hereinafter simply referred to as a "non-solvent") to solidify the macromolecules and allow the macromolecules to form a three-dimensional network structure.

Moreover, the step of forming a support membrane may further comprise a step of preparing a macromolecular solution by dissolving the macromolecule, which is a component of the porous support layer, in a good solvent of said macromolecule.

In order to obtain a support membrane having a predetermined structure, it is necessary to control the impregnation of the macromolecular solution into the substrate. Examples of the method for controlling the impregnation of the macromolecular solution into the substrate include a method in which the time after the application of the macromolecular solution onto the substrate before the immersion of the substrate in a non-solvent is controlled; and a method in which the viscosity of the macromolecular solution is adjusted by controlling the temperature or concentration thereof. These production methods may be combined.

In general, the time after the application of the macromolecular solution onto the substrate before the immersion of the substrate in coagulating bath filled with a non-solvent is preferably within the range of 0.1 to 5 seconds. When the time is within this range, the organic solvent solution containing the macromolecules is solidified after sufficiently penetrating between the fibers of the substrate. The preferable range of the time before the immersion of the substrate in a coagulation bath can be appropriately adjusted depending on the viscosity of the macromolecular solution to be used or the like.

When a macromolecular solution A for forming a first layer with a high hydrophilic macromolecule concentration contains polysulfone as a major component of the porous support layer, the polysulfone concentration of the macromolecular solution A is preferably 10% by weight or more, and more preferably 15% by weight or more. Moreover, the polysulfone concentration of the macromolecular solution A is preferably 25% by weight or less, and more preferably 20% by weight or less. The macromolecule concentration of 10% by weight or more provides peel strength necessary to adhere to the substrate. Moreover, the macromolecule concentration of 25% by weight or less provides a structure having water permeability.

When a macromolecular solution B for forming a second layer with a low hydrophilic macromolecule concentration, also contains polysulfone as a major component, the polysulfone concentration of the macromolecular solution B is preferably 15% by weight or more, and more preferably 17% by weight or more. Moreover, the polysulfone concentration of the macromolecular solution B is preferably 25% by weight or less, and more preferably 20% by weight or less. When the concentration is within this range, at the time of the formation of a polyamide separation functional layer, an amine aqueous solution is efficiently supplied from fine pores formed by phase separation.

When polyvinylpyrrolidone as a hydrophilic macromolecule is mixed into the macromolecular solution A for forming the first layer, the polyvinylpyrrolidone concentration is preferably 0.01% by weight or more, and more preferably 0.1% by weight or more. Moreover, the polyvinylpyrrolidone concentration of the macromolecular solution A is preferably 5% by weight or less, and more preferably 1% by weight or less. The polyvinylpyrrolidone concentration of the macromolecular solution A of 0.01% by weight or more provides an increase in water permeability. The concentration of 5% by weight or less provides peel strength necessary to adhere to the substrate.

In cases where polysulfone is used as a major component, the temperature of the macromolecular solution at the time of the application of the solution onto the substrate may be within the range of 10 to 60° C. in general. When the temperature is within this range, the organic solvent solution containing the macromolecular compounds is solidified after sufficiently penetrating between the fibers of the substrate without macromolecular precipitation. Therefore, the porous support layer is firmly joined to the substrate by an anchor effect and the support membrane according to an embodiment of the present invention is obtained. The preferable range of the temperature of the macromolecular solution may be appropriately adjusted depending on the viscosity of the macromolecular solution to be used or the like.

In the formation of the support membrane, it is preferable that the macromolecular solution B for forming the second layer be applied at the same time as the application of the macromolecular solution A for forming the first layer onto the substrate. In cases where curing time is provided after the macromolecular solution A is applied, a high-density skin layer is formed on the surface of the first layer formed by the phase separation of the macromolecular solution A, thereby significantly decreasing the permeation flow rate. For this reason, it is important that the macromolecular solution A and the macromolecular solution B be applied at the same time so that the macromolecular solution A may not form a high-density skin layer by the phase separation. For example, the phrase "be applied at the same time" encompasses a state in which the macromolecular solution A is in contact with the macromolecular solution B before the macromolecular solution A reaches the substrate, that is, a state in which the macromolecular solution B is already applied onto the macromolecular solution A when the macromolecular solution A is applied onto the substrate.

The application of the macromolecular solution onto the substrate can be carried out by various coating methods, and preferably employed are pre-metered coating methods, such as die coating, slide coating, and curtain coating, in which a coating solution can be supplied in an accurately metered manner. Furthermore, in the formation of the porous support layer of the present invention having a multilayered structure, more preferably used is a double-slit die method in which the macromolecular solution for forming the first layer and the macromolecular solution for forming the second layer are applied at the same time.

The composition of the macromolecular solution A for forming the first layer and that of the macromolecular solution B for forming the second layer may differ from each other. The phrase "composition differs" means that at least one element among the type of macromolecule contained and the solid content concentration thereof, the type of additive and the concentration thereof, and the type of solvent differs from that of the other solution. That is, the composition of the macromolecular solution A and the composition of the macromolecular solution B can be suitably adjusted in a wider range in view of various characteristics, such as strength characteristics, permeability characteristics, and surface characteristics, of the support membrane to be produced.

The good solvent used in the present invention is preferably a solvent which dissolves macromolecular materials. Examples of the good solvent include N-methyl-2-pyrrolidone, tetrahydrofuran, dimethylsulfoxide, amides such as tetramethyl urea, dimethylacetamide, and dimethylformamide, lower alkyl ketones such as acetone, methyl ethyl ketone, esters and lactones such as trimethyl phosphate and γ-butyrolactone, and mixed solvents thereof.

Examples of the non-solvent of the above resins include water; aliphatic hydrocarbons, aromatic hydrocarbons, and aliphatic alcohols, such as hexane, pentane, benzene, toluene, methanol, ethanol, trichloroethylene, ethylene glycol, diethylene glycol, triethylene glycol, propylene glycol, butylene glycol, pentanediol, hexanediol, and low-molecular-weight polyethylene glycol; and mixed solvents thereof.

The above macromolecular solution may contain an additive for adjusting the pore size, porosity, hydrophilicity, elastic modulus, and the like of the support membrane. Examples of the additive for adjusting the pore size and the porosity include water; alcohols; water-soluble macromolecules such as polyethylene glycol, polyvinylpyrrolidone, polyvinyl alcohol, and polyacrylic acid, or a salt thereof; moreover inorganic salts such as lithium chloride, sodium chloride, calcium chloride, and lithium nitrate; formaldehyde; and formamide, but are not limited thereto. Examples of the additive for adjusting the hydrophilicity and the elastic modulus include various surfactants.

As the coagulation bath, water is usually used, but any non-solvent may be used. The membrane morphology of the support membrane varies depending on the composition of the coagulation bath, and therefore the membrane formability of the composite semipermeable membrane also varies. The temperature of the coagulation bath is preferably −20 to 100° C. and more preferably 10 to 30° C. With the temperature being 100° C. or less, the vibration of the coagulation bath surface due to thermal motion is suppressed and a smooth surface can be formed on the separation functional layer-side of the porous support layer. Moreover, with the temperature being −20° C. or more, a solidification rate can be kept relatively high and a good membrane formability is achieved.

Then, a support membrane obtained under such preferable conditions is washed with hot water to remove the membrane-forming solvent remaining in the membrane. The temperature of the hot water is preferably 50 to 100° C. and more preferably 60 to 95° C. When the temperature is higher than this range, the shrinkage degree of the support membrane is high and the water permeability decreases. On the other hand, when the temperature is lower, the washing effect is small.

Finally, the hydrophilic macromolecules are cross-linked by the radiation cross-linking method and thereby made insoluble in water. When gamma rays are used in the radiation cross-linking method, the radiation dose can be suitably changed depending on the type of hydrophilic macromolecule, and the dose for the cross-linking is preferably within the range of 5 to 100 kGy and more preferably within the range of 15 to 50 kGy. The dose being 5 kGy or more promotes the cross-linking of the hydrophilic macromolecules. The dose being 100 kGy or less allows the hydrophilic macromolecules to cross-link without causing the degradation of the hydrophilic macromolecules or of the macromolecules for forming the porous support layer.

The formation of a layer containing polyamide as a major component will be described as an example of the step of forming a separation functional layer composing the composite semipermeable membrane. In the step of forming a polyamide separation functional layer, a polyamide skeleton is formed by interfacial polycondensation on the support membrane surface using an aqueous solution containing the above polyfunctional amine and a water-immiscible organic solvent solution containing the above polyfunctional acid halide.

The polyfunctional amine concentration in the polyfunctional amine aqueous solution is preferably within the range of 0.1% by weight to 20% by weight, and more preferably within the range of 0.5% by weight to 15% by weight. When the concentration is within this range, a sufficient water permeability and a sufficient removal performance for salts and boron can be obtained. The polyfunctional amine aqueous solution may contain a surfactant, an organic solvent, an alkaline compound, an antioxidant and the like as long as they do not disturb the reaction between the polyfunctional amine and the polyfunctional acid halide. The surfactant has effects of improving wettability on the support membrane surface and reducing interfacial tension between the amine aqueous solution and a non-polar solvent. An organic solvent may serve as a catalyst for interfacial polycondensation and therefore the addition of an organic solvent may allow the interfacial polycondensation to proceed efficiently.

For the interfacial polycondensation on the support membrane, the above polyfunctional amine aqueous solution is brought into contact with the support membrane. The contact with the support membrane surface is preferably uniform and continuous. Specifically, such contact can be achieved by a method in which the support membrane is coated with the polyfunctional amine aqueous solution or by a method in which the support membrane is immersed in the polyfunctional amine aqueous solution, for example. The contact time of the support membrane with the polyfunctional amine aqueous solution is preferably within the range of 5 seconds to 10 minutes, and more preferably within the range of 10 seconds to 3 minutes.

After the polyfunctional amine aqueous solution is brought into contact with the support membrane, the solution is sufficiently drained so that droplets may not remain on the membrane. Sufficient draining prevents the remaining of droplets which cause defective points in the composite semipermeable membrane to be formed, and thus prevents the removal performance of the composite semipermeable membrane from decreasing. Examples of the method for draining the liquid include a method described in Japanese Unexamined Patent Publication No. 2-78428, in which the support membrane is vertically held to allow the excess aqueous solution to naturally flow down after the contact with the polyfunctional amine aqueous solution; and a method in which a stream of nitrogen or the like is blown from an air nozzle to forcibly drain the solution. Moreover, drying the membrane surface after the draining can also remove a part of the water of the aqueous solution.

Subsequently, the support membrane after the contact with the polyfunctional amine aqueous solution is brought into contact with the water-immiscible organic solvent solution containing the polyfunctional acid halide to form a separation functional layer made of cross-linked polyamide by interfacial polycondensation.

The polyfunctional acid halide concentration in the water-immiscible organic solvent solution is preferably within the range of 0.01% by weight to 10% by weight, and more preferably within the range of 0.02% by weight to 2.0% by weight. The polyfunctional acid halide concentration of 0.01% by weight or more can provide a sufficient reaction rate. The concentration of 10% by weight or less can suppress the occurrence of a side reaction. It is more preferable that this organic solvent solution be made to contain an acylation catalyst like DMF to promote the interfacial polycondensation.

The water-immiscible organic solvent is preferably one which dissolves polyfunctional acid halides and does not break the support membrane, and should be one inactive against polyfunctional amine compounds and polyfunctional acid halides. Preferred examples thereof include hydrocarbon compounds such as hexane, heptane, octane, nonane, and decane.

The method for bringing the organic solvent solution containing the polyfunctional acid halide into contact with the support membrane is similar to the method for bringing the polyfunctional amine aqueous solution into contact with the support membrane.

In the interfacial polycondensation step of an embodiment of the present invention, it is vital that the support membrane surface be sufficiently covered with the thin cross-linked-polyamide membrane and that the water-immiscible organic solvent solution containing the polyfunctional acid halide and having been brought into contact with the support membrane remain on the membrane. For this purpose, the time for the interfacial polycondensation is preferably 0.1 second or more and 3 minutes or less, and more preferably 0.1 second or more and 1 minute or less. With the time for the interfacial polycondensation being 0.1 second or more and 3 minutes or less, the support membrane surface can be sufficiently covered with the thin cross-linked-polyamide membrane and the organic solvent solution containing the polyfunctional acid halide can be retained on the support membrane.

After the polyamide separation functional layer is formed on the support membrane by the interfacial polycondensation, the excess solvent is drained. As a method for draining the solvent, for example, the method in which the membrane is vertically held and thereby the excess organic solvent naturally flows down to be removed can be used. In this case, the time of vertically holding the membrane is preferably 1 minute or more and 5 minutes or less, and more preferably 1 minute or more and 3 minutes or less. When the time is too short, the separation functional, layer is not completely formed, and when it is too long, over-drying of the organic solvent causes defective parts in the polyamide, separation functional layer, leading to a decrease in the membrane performance.

3. Use of Composite Semipermeable Membrane

The composite semipermeable membrane is wound with a raw water flow passage material such as a plastic net, a permeated water flow passage material such as tricot, and, if needed, a film for improving pressure resistance, around a cylindrical water collecting pipe provided with a large number of drilled pores and the wound composite semipermeable membrane is suitably used as a composite semipermeable membrane element. Moreover, this element can further compose a composite semipermeable membrane module when connected in series or in parallel and housed in a pressure vessel.

The composite semipermeable membrane, the composite semipermeable membrane element, and the composite semipermeable membrane module mentioned above can compose a fluid separation apparatus, in combination with a pump for supplying raw water thereto, an apparatus for pretreating the raw water, and the like. By using this separation apparatus, raw water can be separated into permeated water such as drinking water and concentrated water which has not permeated through a membrane and thereby water suitable for an intended purpose can be obtained.

When the operating pressure of the fluid separation apparatus is higher, the salt removal rate improves. However, considering that the energy required for operation also increases, and in view of the durability of the composite semipermeable membrane, the operating pressure for the water, to be treated to permeate through the composite semipermeable membrane is preferably 1.0 MPa or more and 10 MPa or less. When the temperature of feed water is higher, the salt removal rate decreases. However, the lower the temperature is, the more the membrane permeate flux also decreases. Therefore the temperature is preferably more than 5° C. or more and 45° C. or less. In cases where the feed water is one having a high salt concentration such as seawater, high pH thereof potentially causes scales of magnesium or the like to generate. Moreover, such high pH operation raises a concern about the degradation of the membrane. Therefore the apparatus is preferably operated in a neutral range.

Examples of the raw water treated with the composite semipermeable membrane include a liquid mixture, such as seawater, brine water, and wastewater, containing total dissolved solids (hereinafter referred to as TDS) of 500 mg/L to 100 g/L. Generally, TDS refers to the total amount of dissolved solids and is expressed as "mass/volume" or as "mass ratio" on the supposition that 1 L is 1 kg. According to the definition, TDS can be calculated from the weight of the residue obtained by evaporating the solution filtered through a 0.45 µm filter at a temperature of 39.5 to 40.5° C. and it can be more simply obtained by converting practical salinity.

EXAMPLES

Embodiments of the present invention will be described in more detail below based on examples. However, the present invention is not limited to these examples.
Production of Composite Semipermeable Membrane In the following examples, the polysulfone used was UDEL P-3500 polysulfone, manufactured by Solvay Advanced Polymers L.L.C. The polyvinylpyrrolidone (hereinafter referred to as PVP) used was polyvinylpyrrolidone K 90, manufactured by Wako Pure Chemical Industries, Ltd. The copolymer of vinylpyrrolidone and vinyl acetate used was Kollidon VA64 (hereinafter referred to as VA64), manufactured by BASF. The polyvinyl alcohol (hereinafter referred to as PVA) used was polyvinyl alcohol 3500 (partial saponification-type), manufactured by Wako Pure Chemical Industries, Ltd. The polyethylene glycol (hereinafter PEG) used was polyethylene glycol 500000, manufactured by Wako Pure Chemical Industries, Ltd.

Example 1

A DMF solution of 15% by weight of polysulfone and 0.5% by weight of PVP (macromolecular solution A) and a DMF solution of 15% by weight of polysulfone (macromolecular solution B) were separately prepared by stirring at a temperature of 90° C. for 2 hours. Each prepared macromolecular solution was cooled to the room temperature, and supplied to a separate extruder to be filtered with high precision. Then, the filtered macromolecular solutions were cast at the same time on a filament non-woven fabric (filament diameter: 1 dtex, thickness: about 90 µm, air permeability: 2.0 cc/cm$^2$ s) composed of polyethylene terephthalate fibers with a double-slit die. The macromolecular solution A was cast in a thickness of 70 µm and the macromolecular solution B was cast in a thickness of 90 µl. After the casting, the fabric with the macromolecular solutions cast was immediately immersed in pure water and washed for 5 minutes. The fabric still immersed in pure water was irradiated with gamma rays of 25 kGy to give a support membrane.

The obtained support membrane was immersed in a 4.0% by weight m-PDA aqueous solution for 2 minutes, and then slowly pulled out with the membrane surface kept vertical. After nitrogen was blown from an air nozzle to remove excess aqueous solution from the support membrane surface, an n-decane solution containing 0.12% by weight of trimesic acid chloride at a temperature of 25° C. was applied so that the surface might be completely wet, and the membrane was allowed to stand still for 1 minute. In order to remove the excess solution from the membrane, the membrane surface was kept vertical for 1 minute and the solution was drained. Then, the support membrane was washed with water at a temperature of 45° C. for 2 minutes to give a composite semipermeable membrane.

Example 2

A composite semipermeable membrane was obtained in the same manner as in Example 1 except that a DMF solution of 18% by weight of polysulfone was used as the macromolecular solution B.

Example 3

A composite semipermeable membrane was obtained in the same manner as in Example 1 except that a DMF solution of 15% by weight of polysulfone and 0.05% by weight of PVP was used as the macromolecular solution A and a DMF solution of 18% by weight of polysulfone was used as the macromolecular solution B.

Example 4

A composite semipermeable membrane was obtained in the same manner as in Example 1 except that a DMF solution of 15% by weight of polysulfone and 0.01% by weight of PVP was used as the macromolecular solution A and a DMF solution of 18% by weight of polysulfone was used as the macromolecular solution B.

Example 5

A composite semipermeable membrane was obtained in the same manner as in Example 1 except that a DMF solution of 13% by weight of polysulfone and 3% by weight of PVP was used as the macromolecular solution A and a DMF solution of 18% by weight of polysulfone was used as the macromolecular solution B.

Example 6

A composite semipermeable membrane was obtained in the same manner as in Example 1 except that a DMF solution of 11% by weight of polysulfone and 5% by weight of PVP was used as the macromolecular solution A and a DMF solution of 18% by weight of polysulfone was used as the macromolecular solution B.

Example 7

A composite semipermeable membrane was obtained in the same manner as in Example 1 except that a DMF solution of 15% by weight of polysulfone and 0.5% by weight of VA64 was used as the macromolecular solution A and a DMF solution of 18% by weight of polysulfone was used as the macromolecular solution B.

Example 8

A composite semipermeable membrane was obtained in the same manner as in Example 1 except that a DMF solution of 15% by weight of polysulfone, 0.5% by weight of PVP, and 0.5% by weight of PVA was used as the macromolecular solution A and a DMF solution of 18% by weight of polysulfone was used as the macromolecular solution B.

Example 9

A composite semipermeable membrane was obtained in the same manner as in Example 1 except that a DMF solution of 15% by weight of polysulfone, 0.5% by weight of PVP, and 0.5% by weight of PEG was used as the macromolecular solution A and a DMF solution of 18% by weight of polysulfone was used as the macromolecular solution B.

Example 10

A composite semipermeable membrane was obtained in the same manner as in Example 2 except that a staple fiber non-woven fabric (filament diameter: 0.8 dtex, thickness: about 90 μm, air permeability: 1.0 cc/cm² s) composed of polyethylene terephthalate fibers was used as the substrate.

Example 11

A composite semipermeable membrane was obtained in the same manner as in Example 7 except that a staple fiber non-woven fabric (filament diameter: 0.8 dtex, thickness: about 90 μm, air permeability: 1.0 cc/cm² s) composed of polyethylene terephthalate fibers was used as the substrate.

Example 12

A composite semipermeable membrane was obtained in the same manner as in Example 8 except that a staple fiber non-woven fabric (filament diameter: 0.8 dtex, thickness: about 90 μm, air permeability: 1.0 cc/cm² s) composed of polyethylene terephthalate fibers was used as the substrate.

Example 13

A composite semipermeable membrane was obtained in the same manner as in Example 9 except that a staple fiber non-woven fabric (filament diameter: 0.8 dtex, thickness: about 90 μm, air permeability: 1.0 cc/cm² s) composed of polyethylene terephthalate fibers was used as the substrate.

Comparative Example 1

A DMF solution of 15% by weight of polysulfone was prepared by stirring at a temperature of 90° C. for 2 hours. The prepared macromolecular solution was cooled to the room temperature, and supplied to an extruder to be filtered with high precision. Then, the filtered macromolecular solution was cast in a thickness of 220 μm on a filament non-woven fabric (filament diameter: 1 dtex, thickness: about 90 μm, air permeability: 1.0 cc/cm² s) composed of polyethylene terephthalate fibers with a single-slit die coater. After the casting, the fabric with the macromolecular solution cast was immediately immersed in pure water and washed for 5 minutes. The fabric still immersed in pure water was irradiated with gamma rays of 25 kGy to give a support membrane. A separation functional layer was formed in the obtained support membrane in the same manner as in Example 1, and thus a composite semipermeable membrane was obtained.

Comparative Example 2

A composite semipermeable membrane was obtained in the same manner as in Comparative Example 1 except that a DMF solution of 15% by weight of polysulfone and 0.5% by weight of PVP was used.

Comparative Example 3

A composite semipermeable membrane was obtained in the same manner as in Example 1 except that a DMF solution of 15% by weight of polysulfone was used as the macromolecular solution A and a DMF solution of 18% by weight of polysulfone was used as the macromolecular solution B.

Comparative Example 4

A composite semipermeable membrane was obtained in the same manner as in Example 1 except that a DMF solution of 15% by weight of polysulfone was used as the macromolecular solution A and a DMF solution of 15% by weight of polysulfone and 0.5% by weight of PVP was used as the macromolecular solution B.

Comparative Example 5

A composite semipermeable membrane was obtained in the same manner as in Example 1 except that a DMF solution of 15% by weight of polysulfone and 0.5% by weight of PVP was used as the macromolecular solution A and a DMF solution of 15% by weight of polysulfone and 0.5% by weight of PVP was used as the macromolecular solution B.

In order to determine the separation performance of the obtained composite semipermeable membrane, seawater (TDS concentration: about 3.5% by weight) with the temperature adjusted to 25° C. and with the pH adjusted to 6.5 was supplied to the composite semipermeable membrane at an operation pressure of 5.5 MPa and a membrane filtration treatment was performed for 24 hours. Then, the water quality of the permeated water and the feed water after the treatment was measured to obtain the separation performance.

Salt Removal Rate (TDS Removal Rate)

Using an electrical conductivity meter manufactured by TOA Electronics, Ltd., the electrical conductivities of the feed water and the permeated water were measured to determine the practical salinities thereof. The salt removal rate, i.e., TDS removal rate was calculated by the following formula from the TDS concentrations obtained by converting the practical salinities.

TDS removal rate (%)=100×{1−(TDS concentration in permeated water/TDS concentration in feed water)}

Membrane Permeate Flux

The amount of the membrane-permeated water for the seawater (as the feed water) with the temperature adjusted to 25° C. and with the pH adjusted to 6.5 to be supplied to the composite semipermeable membrane at an operation pressure of 5.5 MPa was expressed in membrane permeate flux (m³/m² day), which was based on the amount (cubic meter) of permeated water per square meter of the membrane surface and per day.

Attenuated Total Reflection Infrared Spectroscopy

ATR-IR measurement was performed between the formation of the support membrane and the formation of the separation functional layer. A 10 cm×10 cm square was cut out from the support membrane and vacuum-dried at a temperature of 50° C. for 24 hours. Then, the porous support layer thereof was peeled off from the substrate. On each of the substrate-side surface and separation functional layer-side surface of the porous support layer, the measurements were performed at arbitrarily-selected 10 points. Avatar360 FT-IR, manufactured by Nicolet, was used for the measurements. As the measurement conditions, the resolution was set to 4 cm⁻¹ and the number of times of scanning was set to 64. The obtained spectra were expressed in absorbance. After automatic baseline correction was performed, the infrared absorption peak intensity ratios ($A_{CO}$)/($A_{COC}$) were obtained and the average value of the ratios resulting from the measurements at the 10 points was calculated.

Air Permeability

Air permeability was measured with a frazier type tester in accordance with JIS L1096 (2010). A 200 mm×200 mm piece was cutout from the substrate and attached to the frazier type tester. The suction fan and the air hole were adjusted so that the inclined barometer might indicate a pressure of 125 Pa, and the air permeability was calculated from a pressure indicated by the vertical barometer and the type of air hole used. As the frazier type tester, KES-F8-AP1, manufactured by Kato tech Co., Ltd., was used.

The above results are shown in Table 1. It is shown that the present invention, in which the concentration distribution of hydrophilic macromolecules in a porous support layer is controlled, provides a composite semipermeable membrane which exhibits a high water permeability while maintaining a high salt removal rate.

support layer, the porous support layer being provided with a substrate-side surface and a separation function layer-side surface, the porous support layer having a higher concentration of hydrophilic macromolecules on the substrate-side surface than that on the separation functional layer-side surface.

2. The composite semipermeable membrane according to claim 1, wherein the porous support layer is formed by applying a macromolecular solution A containing hydrophilic macromolecules for forming a first layer onto the substrate, at the same time applying a macromolecular solution B not containing hydrophilic macromolecules for forming a second layer, and subsequently bringing the substrate into contact with a coagulating bath for phase separation.

TABLE 1

| | Macromolecular solution | | | | Infrared absorption peak intensity ratio $(A_{CO})/(A_{COC})$ | | | Composite semipermeable membrane performance | |
|---|---|---|---|---|---|---|---|---|---|
| | First layer (macromolecular solution A) | | Second layer (macromolecular solution B) | | | | | TDS removal rate (%) | Permeation flow rate ($m^3/m^2$ day) |
| | Polymer | Concentration (% by weight) | Polymer | Concentration (% by weight) | Substrate side | Separation functional layer side | Substrate | | |
| Example 1 | Polysulfone/PVP | 15/0.5 | Polysulfone | 15 | 0.062 | 0.015 | Filament non-woven fabric | 99.64 | 1.11 |
| Example 2 | Polysulfone/PVP | 15/0.5 | Polysulfone | 18 | 0.060 | 0.008 | Filament non-woven fabric | 99.63 | 1.20 |
| Example 3 | Polysulfone/PVP | 15/0.05 | Polysulfone | 18 | 0.036 | 0.011 | Filament non-woven fabric | 99.70 | 1.10 |
| Example 4 | Polysulfone/PVP | 15/0.01 | Polysulfone | 18 | 0.032 | 0.011 | Filament non-woven fabric | 99.75 | 1.07 |
| Example 5 | Polysulfone/PVP | 13/3 | Polysulfone | 18 | 0.157 | 0.020 | Filament non-woven fabric | 99.61 | 1.12 |
| Example 6 | Polysulfone/PVP | 11/5 | Polysulfone | 18 | 0.291 | 0.025 | Filament non-woven fabric | 99.60 | 1.08 |
| Example 7 | Polysulfone/VA64 | 15/0.5 | Polysulfone | 18 | 0.040 | 0.013 | Filament non-woven fabric | 99.71 | 1.16 |
| Example 8 | Polysulfone/PVP/PVA | 15/0.5/0.5 | Polysulfone | 18 | 0.047 | 0.016 | Filament non-woven fabric | 99.65 | 1.13 |
| Example 9 | Polysulfone/PVP/PEG | 15/0.5/0.5 | Polysulfone | 18 | 0.044 | 0.018 | Filament non-woven fabric | 99.67 | 1.11 |
| Example 10 | Polysulfone/PVP | 15/0.5 | Polysulfone | 18 | 0.056 | 0.009 | Staple fiber non-woven fabric | 99.69 | 1.14 |
| Example 11 | Polysulfone/VA64 | 15/0.5 | Polysulfone | 18 | 0.039 | 0.012 | Staple fiber non-woven fabric | 99.66 | 1.09 |
| Example 12 | Polysulfone/PVP/PVA | 15/0.5/0.5 | Polysulfone | 18 | 0.045 | 0.018 | Staple fiber non-woven fabric | 99.64 | 1.08 |
| Example 13 | Polysulfone/PVP/PEG | 15/0.5/0.5 | Polysulfone | 18 | 0.045 | 0.017 | Staple fiber non-woven fabric | 99.68 | 1.08 |
| Comparative Example 1 | Polysulfone | 15 | — | — | — | — | Filament non-woven fabric | 99.75 | 0.90 |
| Comparative Example 2 | Polysulfone/PVP | 15/0.5 | — | — | 0.016 | 0.051 | Filament non-woven fabric | 90.28 | 0.54 |
| Comparative Example 3 | Polysulfone | 15 | Polysulfone | 18 | — | — | Filament non-woven fabric | 99.70 | 0.95 |
| Comparative Example 4 | Polysulfone | 15 | Polysulfone/PVP | 15/0.5 | 0.013 | 0.064 | Filament non-woven fabric | 91.12 | 0.59 |
| Comparative Example 5 | Polysulfone/PVP | 15/0.5 | Polysulfone/PVP | 15/0.5 | 0.012 | 0.056 | Filament non-woven fabric | 90.44 | 0.50 |

The composite semipermeable membrane of the present invention can be used suitably for, in particular, desalination of brine water and seawater.

The invention claimed is:

1. A composite semipermeable membrane comprising a substrate, a porous support layer formed on the substrate, and a separation functional layer formed on the porous 3. The composite semipermeable membrane according to claim 2, wherein the hydrophilic macromolecule is polyvinylpyrrolidone or a copolymer containing polyvinylpyrrolidone as a hydrophilic site.

4. The composite semipermeable membrane according to any of claims 1 to 3, wherein the separation functional layer contains cross-linked polyamide of 50% by weight or more.

5. The composite semipermeable membrane according to any of claims 1 to 3, wherein the substrate is a filament non-woven fabric containing polyester of 50% by weight or more.

* * * * *